United States Patent
Martin et al.

(10) Patent No.: US 12,430,255 B2
(45) Date of Patent: Sep. 30, 2025

(54) DATASET INTEGRITY PROTECTION

(71) Applicant: Dell Products L.P., Round Rock, TX (US)

(72) Inventors: Owen Martin, Hopedale, MA (US); Benjamin Randolph, Uxbridge, MA (US); Michael Scharland, Franklin, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/230,487

(22) Filed: Aug. 4, 2023

(65) Prior Publication Data
US 2025/0045207 A1 Feb. 6, 2025

(51) Int. Cl.
*G06F 12/0875* (2016.01)
*G06F 12/02* (2006.01)

(52) U.S. Cl.
CPC ........ *G06F 12/0875* (2013.01); *G06F 12/023* (2013.01); *G06F 2212/1028* (2013.01)

(58) Field of Classification Search
None
See application file for complete search history.

(56) References Cited

U.S. PATENT DOCUMENTS

| | | | |
|---|---|---|---|
| 2005/0066239 A1* | 3/2005 | Keeton | G06F 11/008 714/E11.02 |
| 2012/0030415 A1* | 2/2012 | Selfin | G06F 3/0647 711/E12.008 |
| 2012/0110258 A1* | 5/2012 | Lakey | G06F 12/0888 711/E12.019 |
| 2014/0006834 A1* | 1/2014 | Ishii | G06F 12/0802 713/340 |
| 2018/0157563 A1* | 6/2018 | Bryant | G06F 11/2015 |
| 2019/0258418 A1* | 8/2019 | Liu | G06F 3/0679 |
| 2022/0121371 A1* | 4/2022 | Durgin | G06F 1/263 |

* cited by examiner

*Primary Examiner* — Stephanie Wu
(74) *Attorney, Agent, or Firm* — Krishnendu Gupta; Nikhil Patel

(57) ABSTRACT

One or more aspects of the present disclosure relate to autonomous write fencing for backup power. In embodiments, an input/output (IO) workload is received at a storage array. Additionally, one or more IO write requests in the IO workload are cached based on a charge level of a backup power supply of the storage array. Further, the cached IO write requests are processed.

12 Claims, 4 Drawing Sheets

DATASET INTEGRITY PROTECTION

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to autonomous write fencing for backup power. In embodiments, an input/output (IO) workload is received at a storage array. Additionally, one or more IO write requests in the IO workload are cached based on a charge level of a backup power supply of the storage array. Further, the cached IO write requests are processed.

In embodiments, the charge level of the backup power supply can be determined.

In embodiments, the backup power supply can be sized based on a maximum vault time.

In embodiments, the maximum vault time can be determined as a function of one or more vault drives of the storage array and a total size of a global memory of the storage array.

In embodiments, the global memory can be partitioned into mirrored and unmirrored portions.

In embodiments, a maximum size for the mirrored portion can be established based on the charge level of the backup power supply.

In embodiments, a change in the charge level of the backup power supply can be identified. Further, sizes of the mirrored and unmirrored portions can be reconfigured based on the change in the charge level.

In embodiments, the one or more IO write requests in the mirrored portion can be cached based on its maximum size.

In embodiments, the one or more IO write requests targeting a logical device being synchronously backed up at a remote data facility (RDF) can be identified.

In embodiments, the one or more IO write requests targeting the logical device can be directed to the unmirrored portion of the global memory based on a status of a link to the RDF and an RDF charge level.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Figure 1:
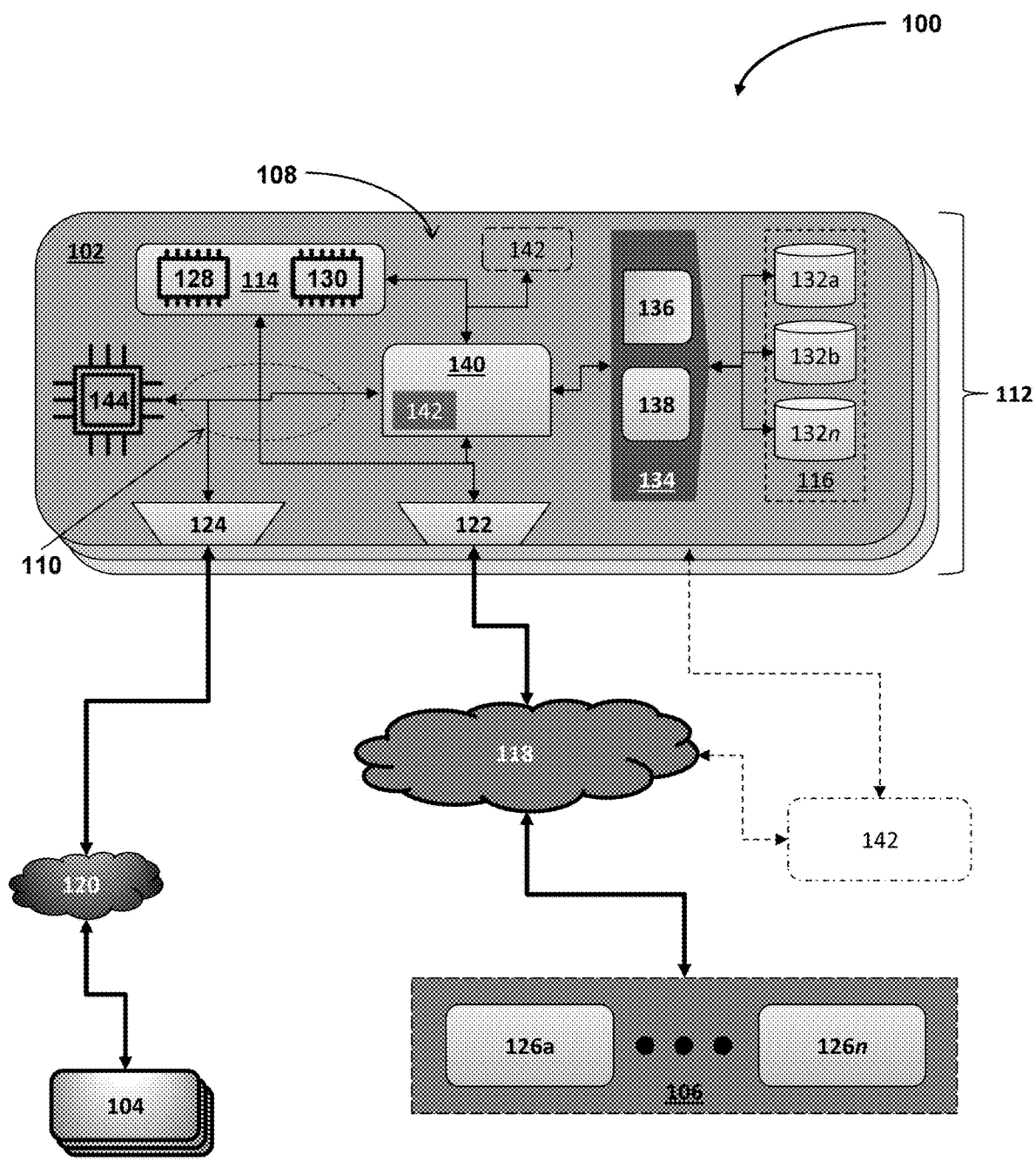
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (ISCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132*a-n*. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132*a-n*).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
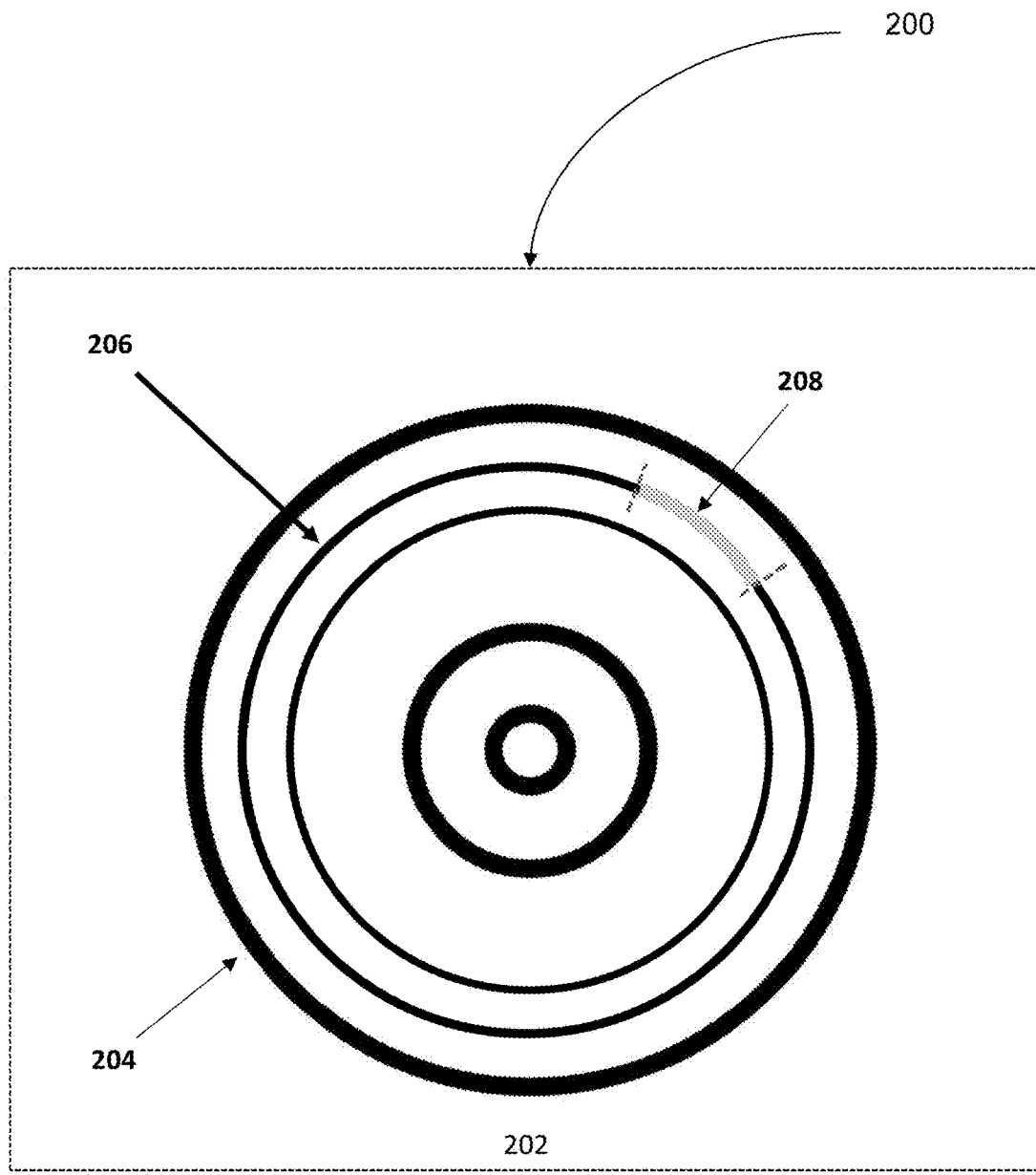
FIG. 2 is a cross-sectional view of a storage device in accordance with embodiments of the present disclosure.

Regarding FIG. 2, the storage array 102 can provide a host, e.g., client machine 126*a* of FIG. 1, with a logical device (e.g., virtual or thin device (TDEV)). The logical device can represent or virtualize zero or more physical address spaces from, e.g., the persistent storage 116 of FIG. 1. For example, the persistent storage 116 can include an HDD 202 with stacks of cylinders 204. Like a vinyl record's grooves, each cylinder 204 can include one or more tracks 206. Further, each track 206 can include several sectors (e.g., track slices or portions) 208. Additionally, each sector 208 can include a set of physical address blocks.

In embodiments, a data services engine (e.g., the EDS 140 of FIG. 1) can establish a logical block address (LBA) corresponding to each physical address block. Accordingly, a continuous set of LBAs can form a logical sector corresponding to a physical sector (e.g., sector 208) of a storage device 132*a-n*. Further, the data services engine can group several logical sectors to establish a logical track. Thus, a logical track can include physical address blocks from several storage devices 132*a-n*. Each logical track can also include a unique identifier (ID), e.g., a track ID (TID). Thus, the data services engine can establish a logical device with a unique device ID by logically grouping one or more logical tracks using their respective TIDs. Furthermore, the data services engine can logically group a logical device's tracks to establish one or more extents with unique extent IDs.

As stated herein, the storage devices 126 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 108 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 108 can establish the hierarchy to include one or more tiers (e.g., subsets of the array's storage and memory) with similar performance capabilities (e.g., response times and uptimes). Thus, the EDS 108 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 108 can also define "fast" and "slow" performance metrics based on relative performance measurements of the array's memory 114 and storage devices 126. Thus, the fast tiers can include memory 114 and storage devices 126 with relative performance capabilities exceeding a first threshold. In contrast, slower tiers can include memory 114 and storage devices 126, with relative performance capabilities falling below a second threshold. In embodiments, the first and second thresholds can have substantially similar values.

Figure 3:
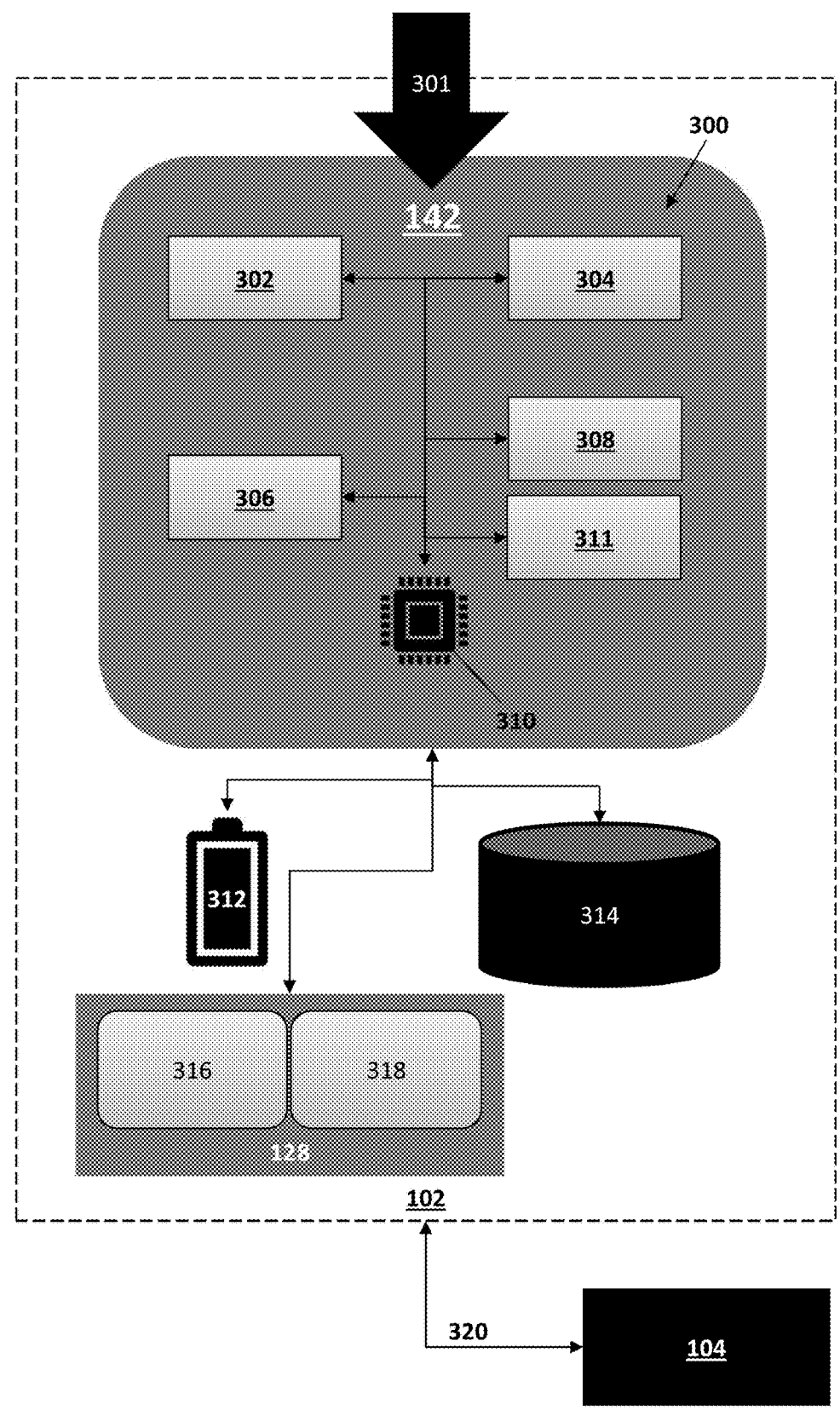
FIG. 3 is a block diagram of a controller in accordance with embodiments of the present disclosure.

Regarding FIG. 3, a storage array 102 can include a controller 142 with logic, hardware, and circuitry 300 that perform one or more data storage services. For example, the controller 142 can process an input/output (IO) workload 301 received by the storage array 102.

In embodiments, the controller 142 can include an IO processor 302 that monitors and analyzes the IO workload 301 and its corresponding IO messages (e.g., IO read/write requests). For example, the IO processor 302 can determine the IO characteristics of the IO workload 301 and its IO messages using metadata from IO messages. The characteristics include IO type, size, read/write ratio, access patterns, etc. Further, the IO processor 302 can identify patterns in IO characteristics using the metadata from current and historical IO workloads and their corresponding IO messages. For example, the IO processor 302 can include logic, hardware, and circuitry (not shown) with a neural self-learning learning architecture that processes the current and historical IO metadata. In a local memory 310 and using the patterns, the IO processor 302 can maintain IO workload models defining IO characteristics of one or more anticipated IO workloads and their corresponding IO messages. Accordingly, the IO workload models can predict access rates corresponding to logical devices and their corresponding tracks targeted by IO messages of anticipated IO workloads.

In embodiments, the controller 142 can include a battery analyzer 304 that analyzes the state of the storage array's backup power supply 312. For example, the battery analyzer 304 can periodically ping or receive a charge level of the backup power supply 312. Further, the battery analyzer 304 can record the current charge level of the backup power supply 312 in the local memory 310. The battery analyzer 304 can also determine if the backup power supply is in use. In such circumstances, the battery analyzer 304 can update a power status flag in the local memory 310 to indicate an occurrence of a power supply failure.

In embodiments, the controller 142 can include a global memory (GM) manager 306 that manages a GM 128 of the storage array 102. For example, the GM manager 306 can partition the GM 128 into a mirrored portion 316 and an unmirrored portion 318. Further, the GM manager 306 can establish the mirrored portion 316 to cache IO write requests from the IO workload 301. The GM manager 306 can also establish the unmirrored portion to cache IO read requests from the IO workload 301. Specifically, the GM manager 306 can size the mirrored portion 316 and unmirrored portion 318 based on the charge level of the back power supply 312.

In embodiments, the GM manager 306 can determine the maximum vault time required to vault the GM 128 in a vault drive 314 (e.g., a dedicated flash drive) in response to a power supply failure. For example, vaulting the GM 128 can include imaging one or both mirrored and unmirrored portions 316/318 in the vault drive 314. Accordingly, the maximum vault time can correspond to the total size of the GM 128 (or the mirrored portion 316). Thus, the GM manager 306 can reconfigure (e.g., resize) the mirrored and unmirrored portions 316/318 based on changes in the current charge level of the backup power supply 312.

In embodiments, the controller 142 can include an IO caching engine 308 that directs IO messages to either the mirrored portion 316 or unmirrored portion 318 of the GM 318. For example, the IO caching engine 308 can direct IO write requests from the IO workload 301 to the mirrored portion 316 of the GM 128. Additionally, the IO caching engine 308 can direct IO read requests from the IO workload 301 to the unmirrored portion 318 of the GM 128. Further, the IO caching engine 308 can monitor the available capacity of the mirrored portion 316 and the unmirrored portion 318 of the GM 128. Thus, if the IO caching engine 308 receives an IO write request when the mirrored portion 316 has reached its capacity limit, the IO caching engine 308 can generate a write pending response message for the source host of the IO write message.

In embodiments, the controller 142 can include a remote system analyzer 311 that determines the current status of a remote data facility (RDF) (e.g., the remote system 104). For example, the remote system analyzer 311 can determine if a communications link 320 between the storage array 102 and the RDF 104 is active (e.g., up and running). Additionally, the remote system analyzer 311 can determine the charge status of a battery backup (not shown) corresponding to the RDF 104.

In embodiments, one or more IO write requests in the IO workload 31 can target a logical device having a synchronous backup at a remote data facility (RDF) 104. The RDF 104 can include a storage array remote (physically) from the storage array 102. Accordingly, the IO caching engine 308 can direct such IO requests to the unmirrored portion 318 of the GM 138. For example, the IO caching engine 308 can direct such IO requests to the unmirrored portion 318 if the communication link 320 is active and the charge level of the RDF is above a threshold.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
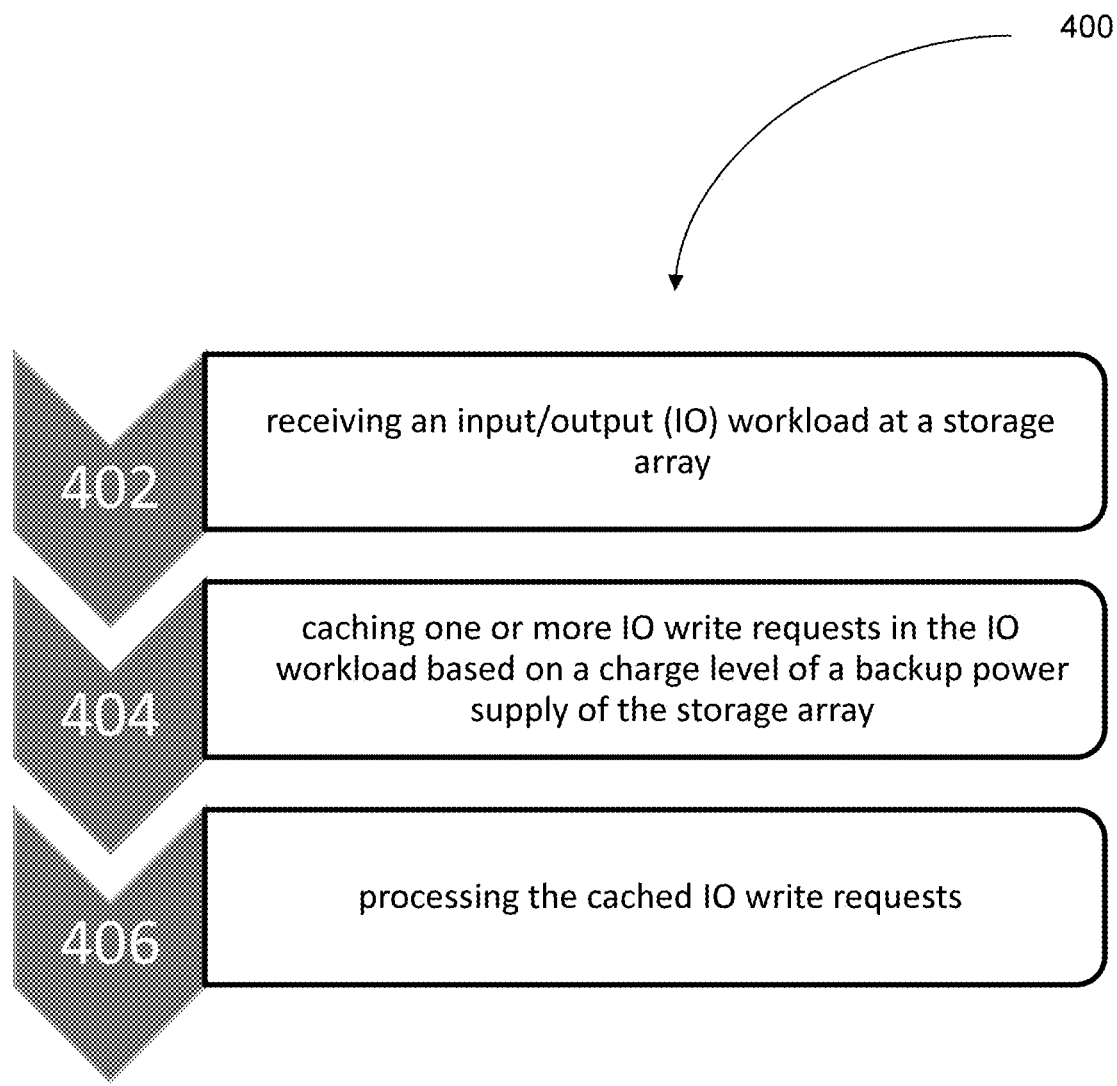
FIG. 4 is a flow diagram of a method for autonomous write fencing for backup power per embodiments of the present disclosure.

Regarding FIG. 4, a method 400 relates to autonomous write fencing for backup power. In embodiments, the controller 142 of FIG. 1 can perform all or a subset of operations corresponding to the method 400.

For example, the method 400, at 402, can include receiving an input/output (IO) workload at a storage array. Additionally, at 404, the method 400 can include caching one or more IO write requests in the IO workload based on a charge level of a backup power supply of the storage array. Further, the method 400, at 406, can include processing the cached IO write requests.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server (s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
    receiving an input/output (IO) workload at a storage array; caching one or more IO write requests in the IO workload based on a charge level of a backup power supply of the storage array, wherein caching the one or more IO write requests includes:
    partitioning a global memory of the storage array into a mirrored portion and an unmirrored portion,
    establishing a maximum size for the mirrored portion based on the charge level of the backup power supply, wherein the maximum size is established proportionally to the charge level to ensure sufficient backup power for destaging cached data, and
    caching the one or more IO write requests in the mirrored portion based on the maximum size;

monitoring changes in the charge level of the backup power supply;
dynamically reconfiguring sizes of the mirrored and unmirrored portions based on detected changes in the charge level;
determining a maximum vault time as a function of one or more vault drives of the storage array and a total size of a global memory of the storage array, wherein the maximum vault time corresponds to a time required to vault the global memory including both the mirrored and unmirrored portions in a vault drive in response to a power supply failure; and
processing the cached IO write requests.

2. The method of claim 1, further comprising:
determining the charge level of the backup power supply.

3. The method of claim 2, further comprising:
sizing the backup power supply based on the maximum vault time.

4. The method of claim 1, further comprising: identifying a change in the charge level of the backup power supply; and reconfiguring sizes of the mirrored and unmirrored portions based on the change in the charge level.

5. The method of claim 1, further comprising:
identifying the one or more IO write requests targeting a logical device being synchronously backed up at a remote data facility (RDF).

6. The method of claim 5, further comprising:
based on a status of a link to the RDF and an RDF charge level, directing the one or more IO write requests targeting the logical device to the unmirrored portion of the global memory.

7. An apparatus with a memory and processor, the apparatus configured to:
receive an input/output (IO) workload at a storage array;
cache one or more IO write requests in the IO workload based on a charge level of a backup power supply of the storage array, wherein caching the one or more IO write requests includes:
partitioning a global memory of the storage array into a mirrored portion and an unmirrored portion,
establishing a maximum size for the mirrored portion based on the charge level of the backup power supply, wherein the maximum size is established proportionally to the charge level to ensure sufficient backup power for destaging cached data, and
caching the one or more IO write requests in the mirrored portion based on the maximum size;
monitor changes in the charge level of the backup power supply;
dynamically reconfigure sizes of the mirrored and unmirrored portions based on detected changes in the charge level;
determine a maximum vault time as a function of one or more vault drives of the storage array and a total size of a global memory of the storage array, wherein the maximum vault time corresponds to a time required to vault the global memory including both the mirrored and unmirrored portions in a vault drive in response to a power supply failure; and
process the cached IO write requests.

8. The apparatus of claim 7, further configured to:
determine the charge level of the backup power supply.

9. The apparatus of claim 8, further configured to:
size the backup power supply based on the maximum vault time.

10. The apparatus of claim 7, further configured to: identify a change in the charge level of the backup power supply; and reconfigure sizes of the mirrored and unmirrored portions based on the change in the charge level.

11. The apparatus of claim 7, further configured to:
identify the one or more IO write requests targeting a logical device being synchronously backed up at a remote data facility (RDF).

12. The apparatus of claim 11, further configured to:
based on a status of a link to the RDF and an RDF charge level, direct the one or more IO write requests targeting the logical device to the unmirrored portion of the global memory.

* * * * *